United States Patent [19]
Yu et al.

[11] Patent Number: 5,539,411
[45] Date of Patent: Jul. 23, 1996

[54] MULTISTATIC RADAR SIGNATURE MEASUREMENT APPARATUS

[75] Inventors: Wai-Mao Yu, Camarillo; Donald P. Hilliard, Oxnard, both of Calif.

[73] Assignee: The United States of America as represented by the Secretary of the Navy, Washington, D.C.

[21] Appl. No.: 559,899

[22] Filed: Nov. 17, 1995

[51] Int. Cl.$^6$ ..................................................... G01S 7/41
[52] U.S. Cl. ............................................ 342/173; 342/54
[58] Field of Search ..................................... 342/173, 165, 342/54, 59, 190, 192

[56] References Cited

U.S. PATENT DOCUMENTS

| | | | |
|---|---|---|---|
| 4,527,161 | 7/1985 | Wehner | 342/152 |
| 4,707,697 | 11/1987 | Coulter et al. | 342/25 |
| 4,879,560 | 11/1989 | McHenry | 342/165 |
| 4,897,660 | 1/1990 | Gold et al. | 342/192 |
| 4,901,080 | 2/1990 | McHenry | 342/1 |
| 5,231,403 | 7/1993 | Pierce | 342/192 |

*Primary Examiner*—John B. Sotomayor
*Attorney, Agent, or Firm*—David S. Kalmbaugh; Melvin J. Sliwka

[57] ABSTRACT

A multistatic radar signature measurement apparatus comprising a curvilinear sensor array of photonic sensors which are used to measure the radar cross section of a target. The array of photonic sensors provide for the simultaneous collection of target scattered measurement data over an approximately semi-spherical field of view. Laser light passing through each photonic sensor of the sensor array is modulated by the photonic sensor in direct proportion to the strength/intensity of scattered waves from the target as the scattered waves pass through each photonic sensor of the sensor array. The modulated light from each sensor of the sensor array is then transmitted to an optical switching network which samples the optical signals from the array. The sampled optical signals are next provided to an RF receiver which converts the sampled optical signals to equivalent RF electrical signals. An analog to digital converter then samples and digitizes the RF signals from the RF receiver providing at its output a serial data stream which is supplied to a digital computer. The digital computer processes the serial data stream from the analog to digital converter calculating the radar cross section for the target.

20 Claims, 7 Drawing Sheets

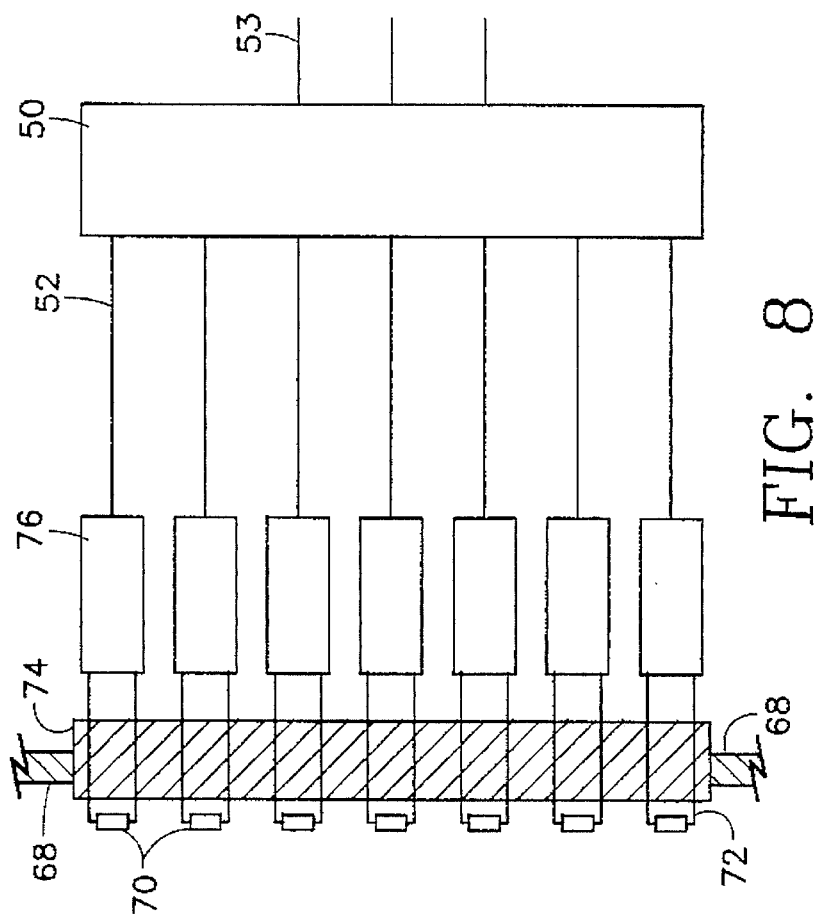
FIG. 8
FIG. 6
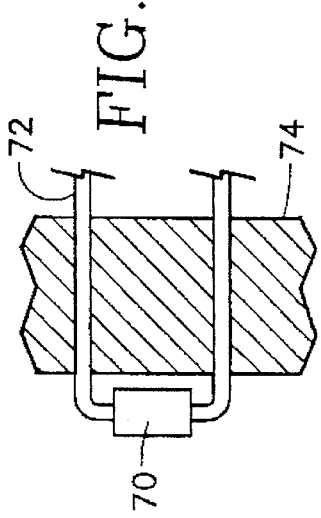
FIG. 7

MULTISTATIC RADAR SIGNATURE MEASUREMENT APPARATUS

BACKGROUND OF THE INVENTION

1. Field of the Invention

The present invention relates generally to the measurement of the radar cross section of an aircraft, ship or other military device for which it is required that the radar cross section be measured. In particular, the present invention relates to multistatic radar signature apparatus which measures radar cross section utilizing a sensor array of photonic receivers.

2. Description of the Prior Art

The bistatic radar detection of threat targets plays an important role in modern electronic warfare. Many weapon systems use bistatic radar signatures for target detection and tracking, end game weapon fusing, and target identification. Monostatic signatures are generally not acceptable for bistatic radar engagement scenarios due to variable radar-to-target illumination and target-to-receiver geometrics as well as the geometry of the target. Accordingly, bistatic radar cross section (RCS) measurements are required for an accurate analysis of almost all radar-to-target detection scenarios-whether the scenario is for surveillance or for tactical semi-active missile homing applications.

Prior art bistatic radar systems are generally characterized by the placement of the radar transmitter relative to the radar receiver in contrast to monostatic radar systems which collocate the transmitter and receiver. Bistatic radar cross section (RCS) measurements are generally made by physically moving the radar receiver with respect to the transmitter to cover the range of bistatic angles required for an accurate RCS measurement. This is also a requirement of two and three dimensional bistatic high-resolution RCS imaging apparatus which incorporate synthetic aperture radar or inverse synthetic aperture radar techniques.

Physically moving the receiver with respect to the radar transmitter to cover each bistatic angle for an RCS measurement is a distinct disadvantage of bistatic RCS measurement apparatus and methods because it requires data to be collected serially which slows the RCS measurement process and adds to the cost of making these measurements. This is true whether the receiver or sensors are moved by hand or electro-mechanically moved. Electro-mechanical RCS measurement systems are also susceptible to mechanical displacement errors of the receiver or sensors which renders the measurement data inaccurate as well as the resulting calculated RCS.

Prior art bistatic RCS measurement apparatus include standard RF/transmission lines to couple the radar receiver to a data acquisition and processing system which is normally located at a considerable distance from the receiver. These transmission lines are not advantages due to limitations of the lines imposed by attenuation and dispersion of the microwave signals transmitted through the lines.

SUMMARY OF THE INVENTION

The present invention overcomes some of the disadvantages of the prior art including those mentioned above in that it comprises a multistatic radar detection measurement apparatus having a plurality of photonic RF/microwave sensors which are used to make multistatic radar signature measurements. The photonic RF/microwave sensors are configured as a curvilinear sensor array and supported by an array structure having a concave semi-spherical surface. Each photonic RF/microwave sensor is, in turn, positioned so that the radius of curvature of the semi-spherical surface of the sensor array is within the line of sight of each photonic sensor of the sensor array to the target being measured.

The target is mounted on a rotating stand which may be programmed to allow for any desired radar illumination angle of the target to be measured. A source of radio frequency (RF)/microwave energy transmits the microwave energy to a collimator which then reflects therefrom forming a planar wave-front of microwave energy. The planar wave of microwave energy is directed toward the target which is positioned downstream from the collimator.

Scattered waves of microwave energy from the target are sensed by the photonic sensors of the sensor array. Laser light passing through each photonic sensor of the sensor array is modulated by the photonic sensor in direct proportion to the strength/intensity of a scattered wave RF field as the scattered waves from the target pass through each photonic sensor of the sensor array. The modulated light from each sensor of the sensor array is then transmitted to an optical switching network which samples the optical signals, that is the network samples a portion of the monochromatic beam of laser light from each photonic sensor of the sensor array. The sampled optical signals are next provided via an optical fiber to an RF receiver which converts the sampled optical signals to equivalent RF electrical signals.

An analog to digital converter, coupled to the RF receiver, samples and digitizes the RF signals from the RF receiver providing at its output a serial data stream which is supplied to a digital computer. The digital computer processes the serial data stream from the analog to digital converter calculating the radar cross section (RCS) of the target.

BRIEF DESCRIPTION OF THE DRAWING

FIG. 6 is a detailed schematic diagram illustrating a plurality of the photonic sensors used in the sensor array of FIG. 4;

FIG. 7 is a detailed schematic diagram illustrating one photonic sensor used in the sensor array of FIG. 4;

FIG. 8 is a detailed schematic diagram illustrating a plurality of photonic sensors of the sensor array of FIG. 4 coupled to a fiber-optic switching network.

DETAILED DESCRIPTION OF THE PREFERRED EMBODIMENT

Figure 1:
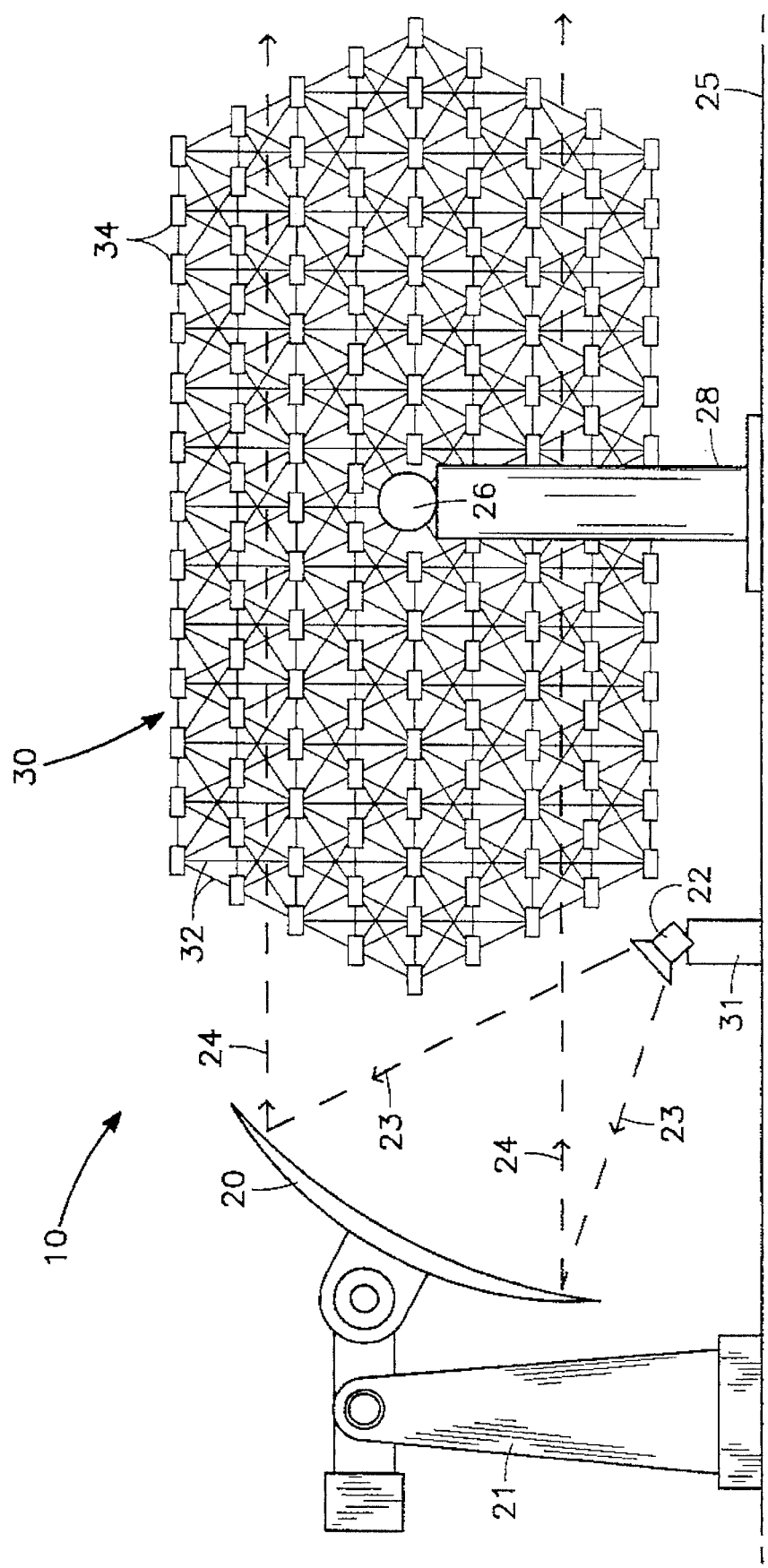
FIG. 1 is a simplified schematic diagram illustrating the multistatic radar signature measurement apparatus constituting the present invention.
Figure 2:
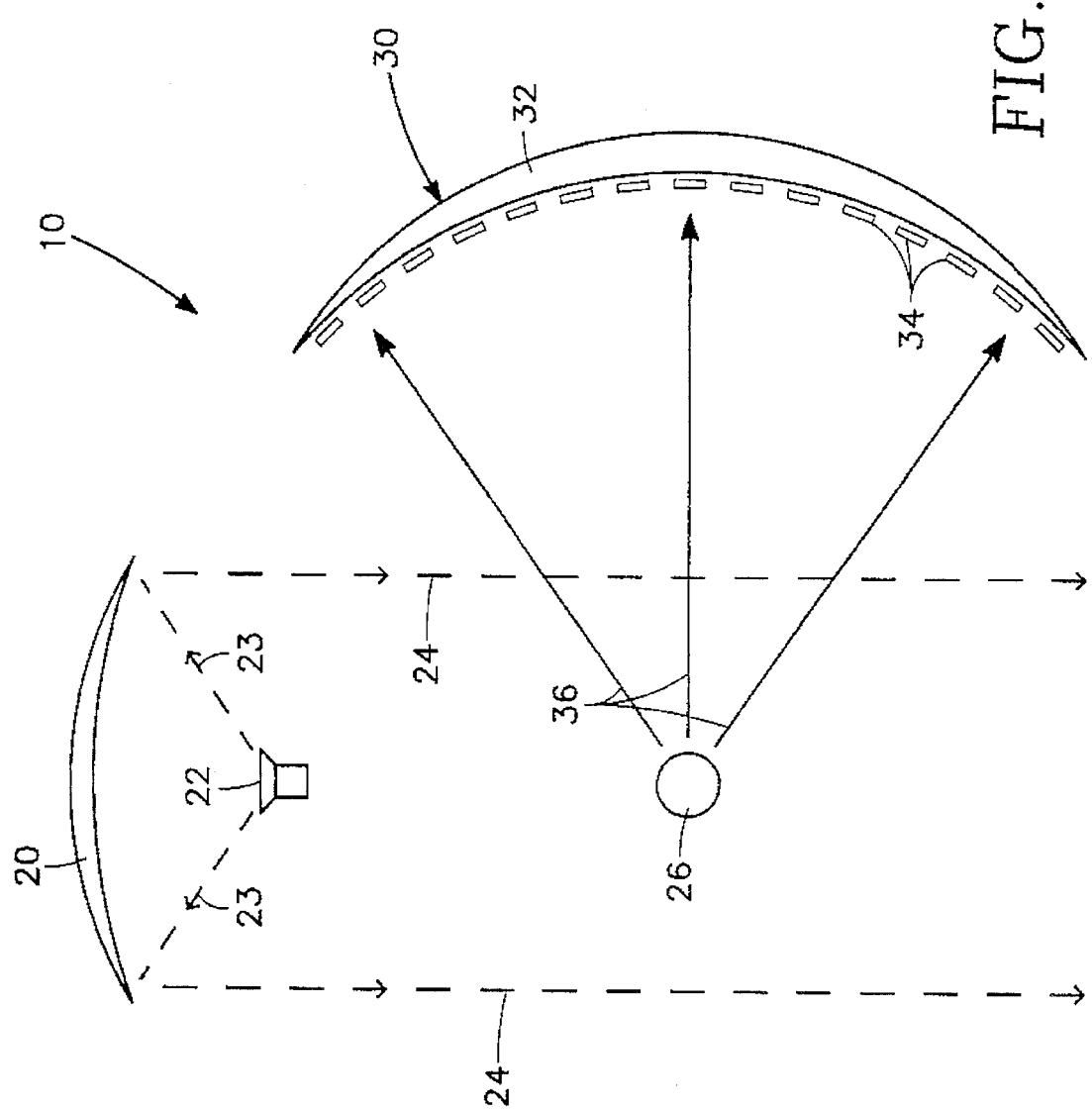
FIG. 2 is a top view of the multistatic radar signature measurement apparatus of FIG. 1.
Figure 3:
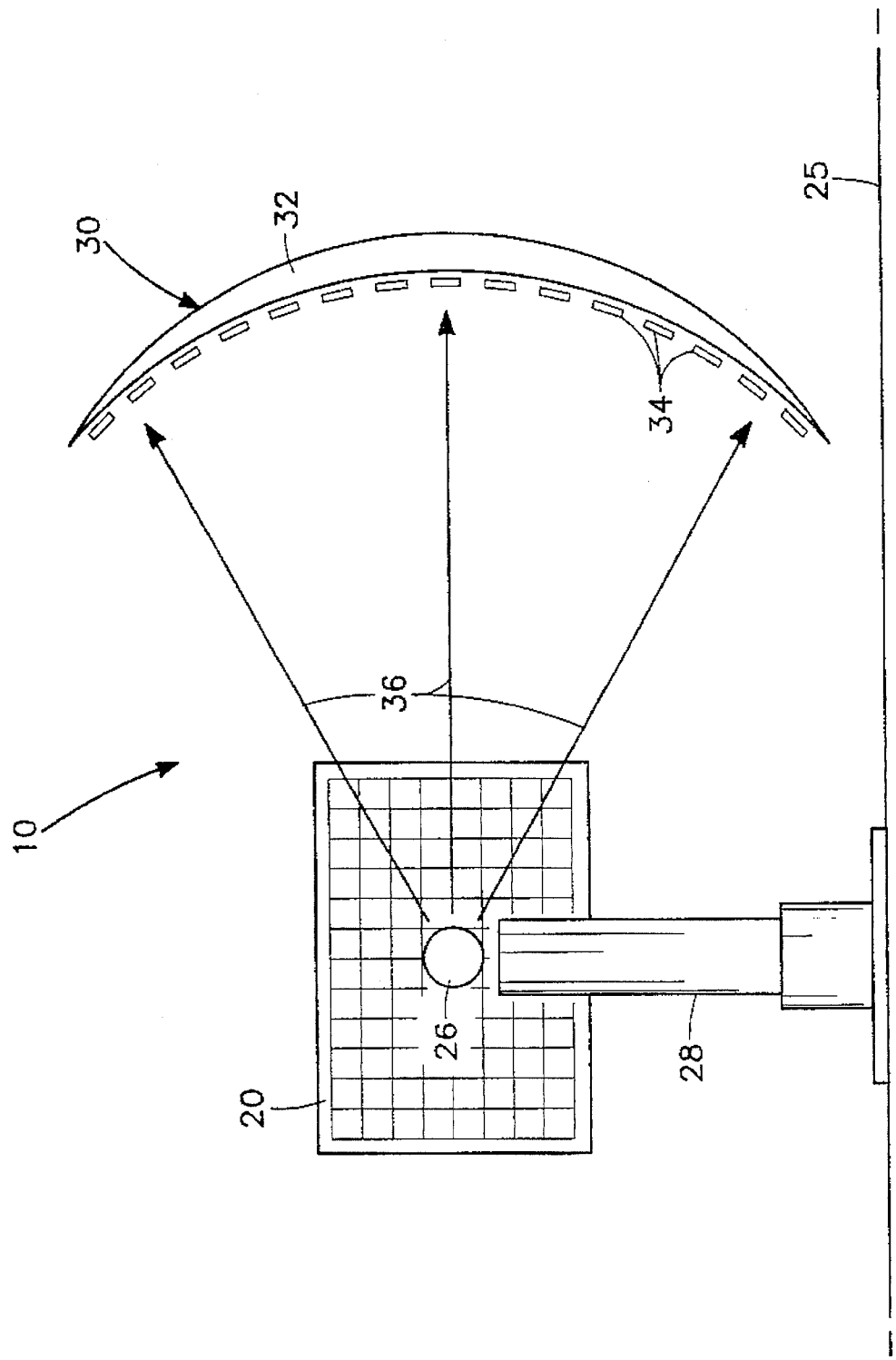
FIG. 3 is a end view of the multistatic radar signature measurement apparatus of FIG. 1.

Referring to FIGS. 1, 2 and 3, there is shown a multistatic radar signature measurement apparatus, designated generally by the reference numeral 10, for use in measuring the radar cross section of a target 26. Multistatic radar signature measurement apparatus 10 comprises a transmitting source 22, such as a Radio Frequency horn transmitter, for transmitting microwave or radio frequency energy 23 within the electro-magnetic spectrum toward a collimator 20. Collimator 20 is mounted on an adjustable support stand 21 which is rigidly affixed to a floor 25. Transmitting source 22 is also mounted on a support stand 31 which is rigidly affixed to floor 25.

Collimator 20 may be, for example, a parabolic reflector which is positioned from transmitting source 22 such that transmitting source 22 is at the focus or focal point of collimator 20. Radio frequency or microwave energy 23 from transmitting source 22 is then reflected from collimator 20 to form a planar wave-front of radio frequency or microwave energy 24. The planar wave of microwave energy 24 is directed toward target 26 which is located downstream from collimator 20.

It should be noted that the target 26 is positioned at a near field region of transmitting source 22 even though target 26 appears to be at the far field region of transmitting source 22.

Target 26 is mounted on a target support stand 28 which is rigidly affixed to floor 25. Target support stand 28 is adapted to rotate target 26 allowing for measurement of varying profiles of target 26. Target support stand 28 may be programmed to rotate the target 26 to a desired radar illumination angle.

Target support stand 28 may fabricated from a metallic or styrofoam material which exhibits minimal radar cross section at the frequency of the incoming planar wave-front of radio frequency or microwave energy 24. This, in turn, allows for an accurate radar cross section measurement of target 26 by multistatic radar signature measurement apparatus 10.

An electromagnetic field sensor array 30 is positioned adjacent target 26. As is best illustrated in FIG. 2 sensor array 30 is orientated vertically at an angle of about ninety degrees to one side of collimator 20 with respect to target 26. Sensor array 30 has a generally concave semi-spherical surface and a support structure, designated generally by the reference numeral 32, which provides support for a plurality of electromagnetic field sensors 34. As shown in FIGS. 1 and 2 electromagnetic field sensors 34 are affixed to support structure 32 at various bistatic angles with respect to target 26 to receive scattered waves 36 of the planar wave-front of microwave energy 24 reflected from target 26 toward sensor array 30.

Figure 4:
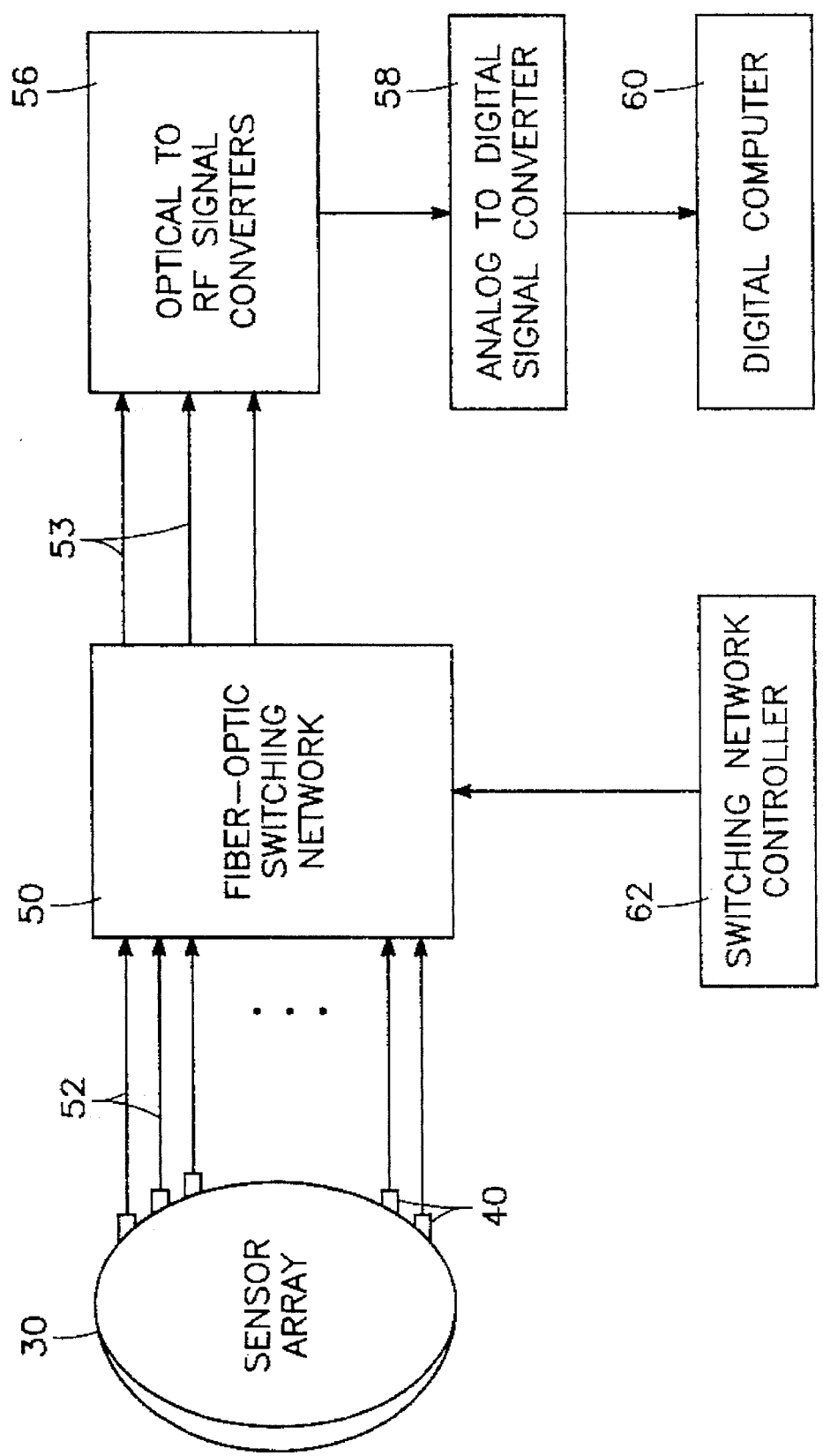
FIG. 4 is a block diagram of the data processing system for processing radar cross section data from the multistatic radar signature measurement apparatus of FIG. 1.

Referring to FIGS. 1, 3 and 4, the sensor elements 34 are distributed on support structure 32 of sensor array 30 in a triad configuration (as is best illustrated in FIG. 1) allowing for the detection of scattered waves 36 at different bistatic angles. In order to detect each of the scattered waves 36 of microwave energy reflected from target 26 the minimum distance separating adjacent electromagnetic field sensors 34 may be determined in accordance with the following expression:

$$d = \frac{R \cdot B}{f \cdot N} \quad (1)$$

where d is the distance separating adjacent sensors, R is the distance from target 26 to the sensors 34, f is the test frequency (frequency of the planar wave-front of radio frequency or microwave energy 24), N is the number of discrete frequency and angles used for a 2-D Fourier Transform operation in radar image processing and B is the test frequency bandwidth or operating frequency bandwidth of the planar wave-front of radio frequency or microwave energy 24. The triad configuration of sensors 34 on support structure 32 of sensor array 30 can provide for six curvilinear array orientations allowing for six different planes of a radar image for processing by a computer.

Referring to FIGS. 6 and 7 polarized light from a light source (not illustrated) is supplied via a polarization maintaining optical fiber 72 to an electro-optic modulator 70. A polarizer (not illustrated) may be used to polarize the light provided by the light source and then transmitted through polarization maintaining optical fiber 72 to electro-optic modulator 70.

In the preferred embodiment of the present invention the light incident on electro-optic modulator 70 may be from any conventional light source. A preferred source of light is a source of monochromatic laser light having a wavelength of approximately 1.3 microns so that the monochromatic laser light may be transmitted through polarization maintaining optical fiber 72 which efficiently transmits light having a wavelength of approximately 1.3 microns. A preferred light source is a Neodymium YAG laser which operates at a wavelength of 1.32 microns and is manufactured by Schwartz Electro-Optics Inc. of Orlando, Fla.

The theory of electro-optic modulation has been extensively discussed in the literature, for example F. S. Chen, "Modulators for Optical Communications" proceedings, of the IEEE, Vol. 58 No. 10, October 1970, pages 1440–1457 and "Optical Waves in Crystals, Propagation and Control of Laser Radiation" by Amnon Yariv and Pochi Yeh. The literature discusses the electro-optic properties of a number of different materials and modulator configurations employing electro-optic crystals. Suitable electro-optic materials for the composition of electro-optic modulator 70 may be selected from the group consisting of $LiNbO_3$, $LiTaO_3$, $KD_2PO_4$(DKDP), $Ba_2NaNb_5O_{15}$, $Sr_{0.25}Ba_{0.75}Nb_2O_6$ and $BaTiO_3$. There are also organic polymer materials such as those made by Hoest Celanese Corporation that exhibit the desired Pockel's effect and thus may be used as electro-optic modulator 70.

Photonic sensors (also referred to as pockel cells) exhibit a property identified as Pockel's linear electro-optic effect which means that the index of refraction of electro-optic materials such as lithium niobite and lithium tantalate changes proportionally to the strength of an electric field being measured with this change being generally exhibited over a frequency range of from 1 hertz to 1000 GHz. The response of these materials to the electric field being measured is directly proportional to a factor known as the electro-optic coefficient which has the units of meters/volt, is a tensor quantity and is typically, but not always, large in the direction of one axis of the electro-optic material and weak in the remaining two axes of the material. When laser light is passed through the electro-optic material it is modulated by the changing index of refraction of the material in proportion to the strength/intensity of the electric field being measured. The laser light passing through the electro-optic material may then be measured by detector means such as photodetector or other sensing element.

Figure 5:
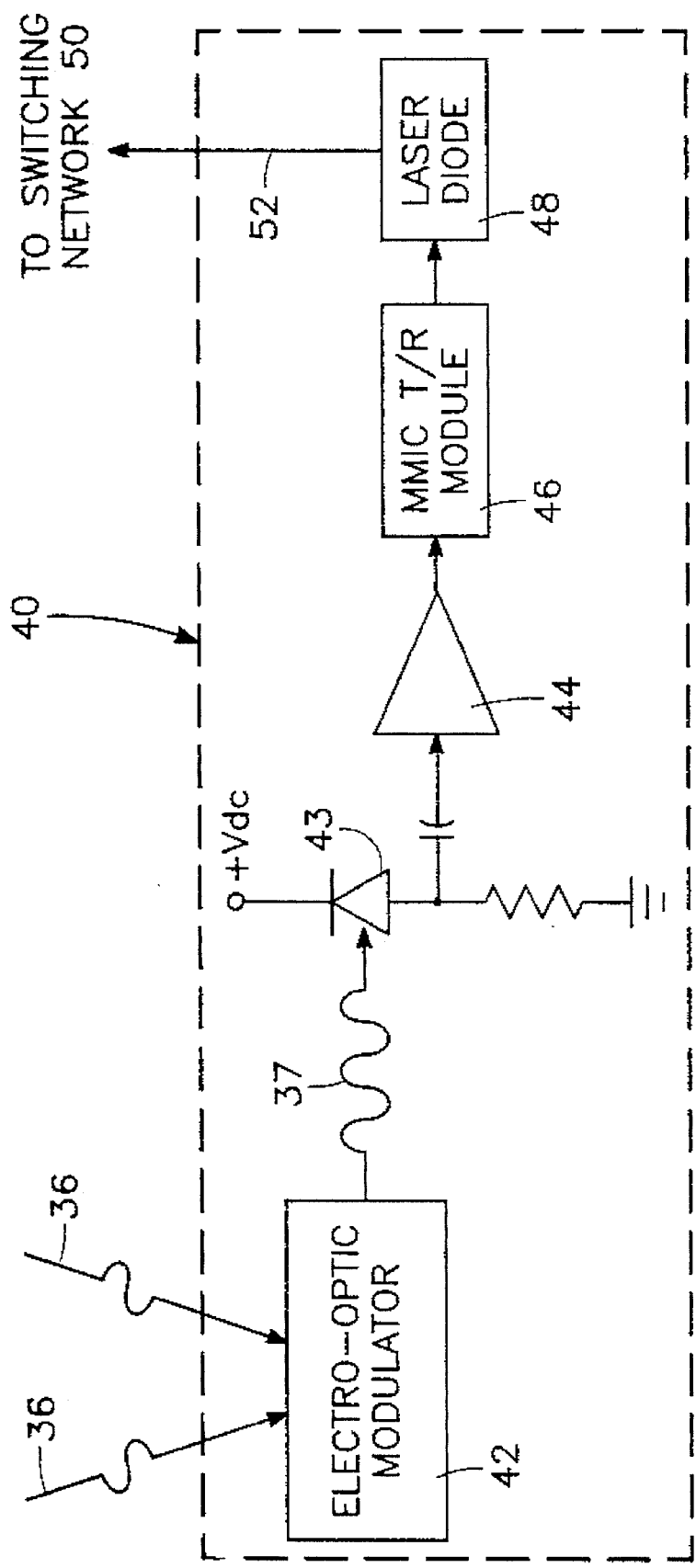
FIG. 5 is a schematic diagram illustrating the optical and electrical components of one of the RF sensing elements of the sensor array of FIG. 4.

Referring now to FIGS. 4 and 5, sensor array 30 has a plurality of electro-magnetic sensors 40 mounted on its curvilinear surface with each electro-magnetic sensor 40 providing a monochromatic beam of laser light through an optical fiber 52 to a fiber-optic switching network 50. Each electro-magnetic sensor 40 comprises an electro-optic modulator 42 and a photodiode 43 for receiving modulated laser light 37 from the electro-optic modulator 42 within its associated sensor 40. Application of the scattered waves 36 from planar wave-front of microwave energy 24 (FIG. 1) onto sensor array 30 modulates laser light 37 propagating through the electro-optic modulator 42 of each sensor 40. The degree of modulation of the laser light 37 by the electro-optic modulator of each sensor 40 is in direct proportion to the field strength of any scattered wave 36 which is incident upon the sensor 40.

The photodiode 43 then provides an electrical signal in response to the modulated light signal 37 having an amplitude that varies in response to the degree of modulation of the laser light 37 received by electro-optic modulator 42. The electrical signal is then amplified by a low noise amplifier 44 and supplied to a monolithic microwave-photonic circuit 46 (MMIC) which functions as a transmit/receive module. The monolithic microwave-photonic circuit 46 is connected to a laser diode 48 and provides an amplified electrical signal which is compatible with laser diode 48.

Laser diode 48, in response to the electrical signal from circuit 46, generates a monochromatic beam of laser light which is transmitted along an optical path in an optical fiber 52 to a fiber-optic switching network 50. It should be noted that the monochromatic beam of laser light generated by laser diode 48 has an intensity which is directly proportion to the field strength of scattered waves 36 from planar wave-front of microwave energy 24 (FIG. 1).

At this time it should also be noted that the photodiode 43 may be coupled to any conventional readout means such as an oscilloscope which provides a visual indication of the intensity of the scattered waves 36 of planar wave-front of microwave energy 24 reflected from target 26.

A switching network controller 62 is connected to fiber-optic switching network 50 and provides electrical control signals to fiber-optic switching network 50. Fiber-optic switching network 50, in response to these control signals, samples a portion of the monochromatic beam of laser light from each sensor 40 of sensor array 30 and then provides the sampled portions of laser light via optical fiber 53 to a optical to radio frequency signal converter 56.

The optical to radio frequency signal converter 56 converts the sampled portions of laser light from each sensor 40 of sensor array 30 to radio frequency (RF) electrical signals which are analog signals. These radio frequency (RF) electrical signals are supplied to an analog to digital signal converter 58. The optical to radio frequency signal converter 56 generally comprises a plurality of monolithic microwave-photonic circuit (MMIC) transmit/receive modules or any other photonic type device which receive optical signals from an optical device such as laser diode 43 and then convert these optical signals to equivalent radio frequency signals in the frequency range from about 1 hertz to 1000 GHz.

The analog to digital signal converter 58 samples and digitizes the RF signals from optical to radio frequency signal converter 56 providing at its output a serial data stream which is supplied to a digital computer 60. Digital computer 60 will then process the serial data stream from analog to digital signal converter 58 calculating the radar cross section (RCS) for target 26 (FIG. 1) using well known techniques for calculating the radar cross section of a target such as an aircraft, missile or the like.

Referring now to FIGS. 1, 6, 7 and 8, there is shown a detailed structural layout of the interfacing between the electro-optic modulator 70 and the support structure of electromagnetic field sensor array 30. Each electro-optic modulator 70 is secured to the curvilinear surface of electromagnetic field sensor array 30 by a mounting support assembly 68 which includes a generally rectangular shaped support member 74. Support member 74 is, in turn, adapted to have one or more of the electro-optic modulators 70 of sensor array 30 mounted thereon. As is best illustrated in FIG. 7, the polarization maintaining optical fiber 72 are mounted within support bracket 74 allowing the polarization maintaining optical fiber 72 to polarized laser light to its associated electro-optic modulator 70.

It should be understood that the support assembly 68 which includes support member 74 should be fabricated from radar absorbent materials to minimize the RF scattering interference caused by the support structure of electro-magnetic field sensor array 30 and thus insure an accurate radar cross section measurement of target 26 by multistatic radar signature measurement apparatus 10. It should also be noted that each of the electro-optic modulators 70 of multistatic radar signature measurement apparatus 10 exhibits a low radar cross section scattering effect when exposed to the scattered waves 36 from the planar wave-front of microwave energy 24 thereby substantially increasing the accuracy of the RCS made by multistatic radar signature measurement apparatus 10.

Figure 9:
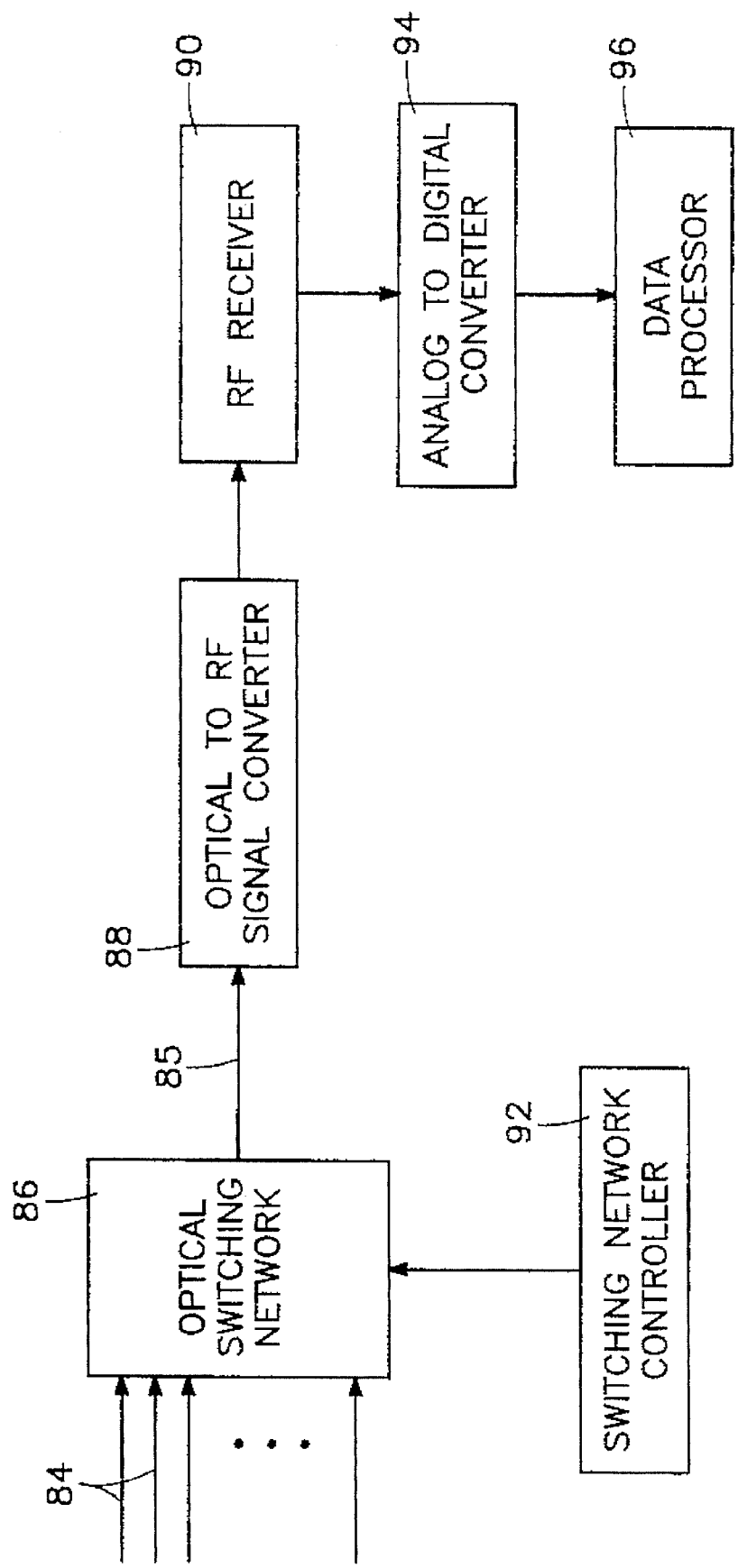
FIG. 9 is an alternative embodiment of a data processing system for processing radar cross section data from the multistatic radar signature measurement apparatus of FIG. 1.

Referring to FIG. 1, 2 and 9, there is shown an alternative data processing network in FIG. 9 which may be used to process optical data provided by the sensor elements 34 distributed on the curvilinear support structure 32 of sensor array 30. Optical switching network 86 samples the optical signals, that is network 86 samples a portion of the monochromatic beam of laser light from each sensor element 34 of sensor array 30. The sampled optical signals are next provided via an optical fiber 85 to an optical to RF receiver 88 which converts the sampled optical signals to equivalent RF electrical signals.

An analog to digital converter 94 samples and digitizes the RF signals from RF receiver 90 providing at its output a serial data stream which is supplied to a data processor 96. Data processor 96 processes the serial data stream from analog to digital converter 94 calculating the radar cross section (RCS) for target 26 (FIG. 1) again using well known techniques for calculating the radar cross section of a target such as an aircraft, missile or the like.

The sensor array 30 of multistatic radar signature measurement apparatus 10 can be selectively activated for a specific signature and imaging task required of a particular target, such as a missile, under test by apparatus 10. Other configurations of multistatic radar signature measurement apparatus 10 are also possible such as, for example, using a transmitting device located at the center of a sensor array to transmit a planar wave-front of radio frequency or microwave energy toward a target and having a plurality of sensors on the array receive the electro-magnetic waves reflected from the target.

From the foregoing it may readily be seen that the present invention comprises a new, unique, and exceedingly useful which constitutes a considerable improvement over the known prior art. Obviously, many modifications and variations of the present invention are possible in light of the above teachings. It is therefore, to be understood that within the scope of the appended claims the invention may be practiced otherwise than as specifically described.

What is claimed is:

1. A multistatic radar signature measurement apparatus for measuring a radar cross section of a target, said multistatic radar signature measurement apparatus comprising:

a source for transmitting microwave energy;

reflecting means for receiving said microwave energy from said source, said reflecting means reflecting said microwave energy to form a planar wave-front of microwave energy;

said source being positioned at a focal point of said reflecting means;

a target support stand positioned downstream from said reflecting means, said target support stand having said target mounted thereon, said target support stand rotating said target allowing for measurements of varying profiles of said target;

said target receiving said planar wave-front of microwave energy and reflecting therefrom scattered waves of said planar wave-front of microwave energy;

an electromagnetic field sensor array positioned adjacent said target, said electromagnetic field sensor array having a generally concave semi-spherical surface and a plurality of electro-optic sensors mounted on the concave semi-spherical surface of said electromagnetic field sensor array;

said plurality of electro-optic sensors receiving the scattered waves of said planar wave-front of microwave energy reflected from said target;

each of said electro-optic sensors receiving polarized monochromatic light, the scattered waves of said planar wave-front of microwave energy incident upon each of said electro-optic sensors modulating the polarized monochromatic light as it transverses said electro-optic sensor;

sensing means for detecting modulated monochromatic light exiting from each of said electro-optic sensors, said sensing means providing radio frequency electrical signals indicative of the intensity of the scattered waves of said planar wave-front of microwave energy incident upon said electro-optic sensors;

an analog to digital converter connected to said sensing means to receive said radio frequency electrical signals, said analog to digital converter converting said radio frequency electrical signals into digital equivalent signals; and a digital processor connected to said analog to digital converter to receive said digital equivalent signals, said digital processor, responsive to said digital equivalent signals, calculating the radar cross section of said target.

2. The multistatic radar signature measurement apparatus of claim 1 wherein said reflecting comprises a parabolic reflector.

3. The multistatic radar signature measurement apparatus of claim 1 wherein said reflecting comprises a collimator.

4. The multistatic radar signature measurement apparatus of claim 1 wherein each of said plurality of electro-optic sensors comprises an electro-optic crystal.

5. The multistatic radar signature measurement apparatus of claim 4 wherein said electro-optic crystal is fabricated from an electro-optic material selected from the group consisting of $LiNbO_3$, $LiTaO_3$, $KD_2PO_4(DKDP)$, $Ba_2NaNb_5O_{15}$, $Sr_{0.25}Ba_{0.75}Nb_2O_6$ and $BaTiO_3$.

6. The multistatic radar signature measurement apparatus of claim 5 wherein said electro-optic crystal comprises a pockel cell.

7. The multistatic radar signature measurement apparatus of claim 1 wherein the minimum distance separating adjacent electro-optic sensors to detect the scattered waves of said planar wave-front of microwave energy reflected from said target is determined in accordance with the following expression:

$$d = \frac{R \cdot B}{f \cdot N}$$

where d is the distance separating said adjacent electro-optic sensors, R is the distance from said target to said electro-optic sensors, f is a test frequency, N is the number of discrete frequency and angles used for a 2-D Fourier Transform operation, and B is a test frequency bandwidth.

8. The multistatic radar signature measurement apparatus of claim 1 wherein said plurality of electro-optic sensors are positioned on said electromagnetic field sensor array in a triad configuration to provide for six curvilinear array orientations allowing for six different planes of a radar image of said target for processing by said digital processor.

9. A multistatic radar signature measurement apparatus for measuring a radar cross section of a target, said multistatic radar signature measurement apparatus comprising:

a microwave energy source for transmitting microwave energy;

a collimator positioned to receive said microwave energy from said microwave energy source, said collimator reflecting said microwave energy to form a planar wave-front of microwave energy;

a target support stand positioned downstream from said collimator, said target support stand having said target mounted thereon, said target support stand rotating said target allowing for measurements of varying profiles of said target;

said target receiving said planar wave-front of microwave energy and reflecting therefrom scattered waves of said planar wave-front of microwave energy;

An electromagnetic field sensor array positioned adjacent said target, said electromagnetic field sensor array having a generally concave semi-spherical surface and a plurality of electro-optic sensors mounted on the concave semi-spherical surface of said electromagnetic field sensor array;

said plurality of electro-optic sensors receiving the scattered waves of said planar wave-front of microwave energy reflected from said target;

each of said electro-optic sensors receiving polarized monochromatic light, the scattered waves of said planar wave-front of microwave energy incident upon each of said electro-optic sensors modulating the polarized monochromatic light as it transverses said electro-optic sensor;

sensing means for detecting modulated monochromatic light exiting from each of said electro-optic sensors, said sensing means providing radio frequency electrical signals indicative of the intensity of the scattered waves of said planar wave-front of microwave energy incident upon said electro-optic sensors;

said sensing means including:

a first plurality of optical fibers, one of said first plurality of optical fibers being connected to each of said electro-optic sensors;

a fiber-optic switching network having a plurality of optical inputs, a control signal input and a plurality of optical outputs, each of said first plurality of optical fibers being connected to one of said optical inputs of said fiber optic switching network;

a switching network controller connected to the control signal input of said fiber-optic switching network;

a second plurality of optical fibers, each of said second plurality of optical fibers being connected to one of said optical outputs of said fiber optic switching network;

an optical to radio frequency signal converter having a plurality of optical inputs and a signal output, each of the plurality of optical inputs of said optical to radio frequency signal converter being connected to one of said second plurality of optical fibers;

an analog to digital converter connected to the signal output of the optical to radio frequency signal converter of said sensing means to receive said radio frequency electrical signals, said analog to digital converter converting said radio frequency electrical signals into digital equivalent signals; and a digital processor connected to said analog to digital converter to receive said digital equivalent signals, said digital processor, responsive to said digital equivalent signals, calculating the radar cross section of said target.

10. The multistatic radar signature measurement apparatus of claim 9 wherein each of said plurality of electro-optic sensors comprises an electro-optic crystal.

11. The multistatic radar signature measurement apparatus of claim 10 wherein said electro-optic crystal is fabricated from an electro-optic material selected from the group consisting of $LiNbO_3$, $LiTaO_3$, $KD_2PO_4$(DKDP), $Ba_2NaNb_5O_{15}$, $Sr_{0.25}Ba_{0.75}Nb_2O_6$ and $BaTiO_3$.

12. The multistatic radar signature measurement apparatus of claim 10 wherein said electro-optic crystal comprises a pockel cell.

13. The multistatic radar signature measurement apparatus of claim 9 wherein the minimum distance separating adjacent electro-optic sensors to detect the scattered waves of said planar wave-front of microwave energy reflected from said target is determined in accordance with the following expression:

$$d = \frac{R \cdot B}{f \cdot N}$$

where d is the distance separating said adjacent electro-optic sensors, R is the distance from said target to said electro-optic sensors, f is a test frequency, N is the number of discrete frequency and angles used for a 2-D Fourier Transform operation, and B is a test frequency bandwidth.

14. The multistatic radar signature measurement apparatus of claim 9 wherein said plurality of electro-optic sensors are positioned on said electromagnetic field sensor array in a triad configuration to provide for six curvilinear array orientations allowing for six different planes of a radar image of said target for processing by said digital processor.

15. A multistatic radar signature measurement apparatus for measuring a radar cross section of a target, said multistatic radar signature measurement apparatus comprising:

a microwave energy source for transmitting microwave energy;

a collimator positioned to receive said microwave energy from said microwave energy source, said collimator reflecting said microwave energy to form a planar wave-front of microwave energy;

an adjustable support stand having said collimator mounted thereon;

said microwave energy source being positioned at a focal point of said collimator;

a target support stand positioned downstream from said collimator, said target support stand having said target mounted thereon, said target support stand rotating said target allowing for measurements of varying profiles of said target;

said target receiving said planar wave-front of microwave energy and reflecting therefrom scattered waves of said planar wave-front of microwave energy;

an electromagnetic field sensor array positioned adjacent said target, said electromagnetic field sensor array having a generally concave semi-spherical surface and a plurality of electro-optic sensors mounted on the concave semi-spherical surface of said electromagnetic field sensor array;

said plurality of electro-optic sensors being positioned on said electromagnetic field sensor array in a triad configuration to provide for six curvilinear array orientations allowing for six different planes of a radar image of said target;

said plurality of electro-optic sensors receiving the scattered waves of said planar wave-front of microwave energy reflected from said target;

each of said electro-optic sensors receiving polarized monochromatic light, the scattered waves of said planar wave-front of microwave energy incident upon each of said electro-optic sensors modulating the polarized monochromatic light as it transverses said electro-optic sensor;

sensing means for detecting modulated monochromatic light exiting from each of said electro-optic sensors, said sensing means providing radio frequency electrical signals indicative of the intensity of the scattered waves of said planar wave-front of microwave energy incident upon said electro-optic sensors;

said sensing means including:

a first plurality of optical fibers, one of said first plurality of optical fibers being connected to each of said electro-optic sensors;

a fiber-optic switching network having a plurality of optical inputs, a control signal input and a plurality of optical outputs, each of said first plurality of optical fibers being connected to one of said optical inputs of said fiber optic switching network;

a switching network controller connected to the control signal input of said fiber-optic switching network;

a second plurality of optical fibers, each of said second plurality of optical fibers being connected to one of said optical outputs of said fiber optic switching network;

an optical to radio frequency signal converter having a plurality of optical inputs and a signal output, each of the plurality of optical inputs of said optical to radio frequency signal converter being connected to one of said second plurality of optical fibers;

an analog to digital converter connected to the signal output of the optical to radio frequency signal converter of said sensing means to receive said radio frequency electrical signals, said analog to digital converter converting said radio frequency electrical signals into digital equivalent signals; and a digital computer connected to said analog to digital converter to receive said digital equivalent signals, said digital computer, responsive to said digital equivalent signals, calculating the radar cross section of said target, said digital computer being adapted to process the six different planes of said radar image of said target.

16. The multistatic radar signature measurement apparatus of claim 15 wherein each of said plurality of electro-optic sensors comprises an electro-optic crystal.

17. The multistatic radar signature measurement apparatus of claim 16 wherein said electro-optic crystal is fabricated from an electro-optic material selected from the group consisting of $LiNbO_3$, $LiTaO_3$, $KD_2PO_4(DKDP)$, $Ba_2NaNb_5O_{15}$, $Sr_{0.25}Ba_{0.75}Nb_2O_6$ and $BaTiO_3$.

18. The multistatic radar signature measurement apparatus of claim 16 wherein said electro-optic crystal comprises a pockel cell.

19. The multistatic radar signature measurement apparatus of claim 15 wherein the minimum distance separating adjacent electro-optic sensors to detect the scattered waves of said planar wave-front of microwave energy reflected from said target is determined in accordance with the following expression:

$$d = \frac{R \cdot B}{f \cdot N}$$

where d is the distance separating said adjacent electro-optic sensors, R is the distance from said target to said electro-optic sensors, f is a test frequency, N is the number of discrete frequency and angles used for a 2-D Fourier Transform operation, and B is a test frequency bandwidth.

20. The multistatic radar signature measurement apparatus of claim 15 wherein each of said plurality of electro-optic sensors comprises:

an electro-optic crystal, said electro-optic crystal responsive to the scattered waves of said planar wave-front of microwave energy incident thereon modulating said polarized monochromatic light as it transverses said electro-optic crystal;

a photodiode being positioned adjacent said electro-optic crystal said photodiode receiving said polarized monochromatic light as it exits said electro-optic crystal;

said photodiode providing an electrical signal indicative of the intensity of the scattered waves of said planar wave-front of microwave energy incident upon said electro-optic sensor.

a low noise amplifier having an input connected to said photodiode and an output;

a monolithic microwave-photonic circuit having an input connected to the output of said low noise amplifier and an output;

a laser diode having an input connected to the output of said monolithic microwave-photonic circuit, said laser diode generating a monochromatic beam of laser light, said monochromatic beam of laser light being transmitted through one of said first plurality of optical fibers to said fiber-optic switching network.

* * * * *